US006990629B1

(12) United States Patent
Heaney et al.

(10) Patent No.: US 6,990,629 B1
(45) Date of Patent: Jan. 24, 2006

(54) PUBLISHING SYSTEM FOR INTRANET

(75) Inventors: Steven Heaney, Houston, TX (US); Nicolas James Williams, Histon (GB); Eric Brown, Royston (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 592 days.

(21) Appl. No.: 10/030,956

(22) PCT Filed: Jul. 27, 2000

(86) PCT No.: PCT/GB00/02844

§ 371 (c)(1), (2), (4) Date: Jun. 11, 2002

(87) PCT Pub. No.: WO01/08044

PCT Pub. Date: Feb. 1, 2001

(30) Foreign Application Priority Data

Jul. 27, 1999 (GB) .................................. 9917554

(51) Int. Cl.
*G06F 17/00* (2006.01)

(52) U.S. Cl. ............... 715/500; 715/513; 707/102; 707/103

(58) Field of Classification Search ............ 715/513, 715/515, 517, 523, 526, 530, 500; 707/102, 707/103
See application file for complete search history.

(56) References Cited

U.S. PATENT DOCUMENTS

| | | | |
|---|---|---|---|
| 5,732,219 A | 3/1998 | Blumer et al. | 395/200.57 |
| 5,778,367 A | 7/1998 | Wesinger, Jr. et al. | 707/10 |
| 5,870,552 A | 2/1999 | Dozier et al. | 395/200.49 |
| 6,418,446 B1 * | 7/2002 | Lection et al. | 707/103 R |
| 6,463,440 B1 * | 10/2002 | Hind et al. | 707/102 |
| 6,507,856 B1 * | 1/2003 | Chen et al. | 715/513 |

FOREIGN PATENT DOCUMENTS

| | | |
|---|---|---|
| WO | WO 98/18087 | 4/1998 |
| WO | WO01/08044 A2 | 7/2000 |

OTHER PUBLICATIONS

Dirking, B. "Info Access Announces the Virtual Webmaster™". http://www.infoaccess.com/betamain/HT49903.htm (1999), pp. 1-2.

Goossens, M. "Clean up your Web Pages with HTML 'tidy'". http://consult.cern.ch/cnls/234/Pr/art_tidy.html (Feb. 2, 2000), pp. 1-4.

Johnson, M. "XML for the Absolute Beginner". http://www.javaworld.com/javaworld/jw-04-1999/f_jw-04-xml-p.html (Apr. 1999), pp. 1-25.

(Continued)

*Primary Examiner*—Sanjiv Shah
(74) *Attorney, Agent, or Firm*—Jody Lynn DeStefanis; William L. Wang; Dale Gaudier (57) ABSTRACT

A method and system for publishing information on a network-based computer system is disclosed using a network of client computers, network file server and a Light Weight Directory Access Protocol (LDAP) directory server, wherein the LDAP directory server is adapted to store information defining and limiting the rights of authors and readers in the system; and the network file server is adapted to resolve file server pointers to one or more files on the file server and directory files on the LDAP directory server transmitted from the client computer into requests for files and directory files; to retrieve from the LDAP directory server directory content; and to convert the directory content into web-publishable information and including the web-publishable information as part of the requested files displayed on the client computer for editing further parts of the files.

25 Claims, 6 Drawing Sheets

OTHER PUBLICATIONS

Karpinski, R. "Standards Help Blur Distinctions in Browsers". http://www.internetwk.com/news1198/news110698-7.htm (Nov. 6, 1998), pp. 1-4.

Nelson, M. "DataChannel integrates XSA". http://www.infoworld.com/cgi-bin/displayArchive.pl?/98/45/i08-45.66.htm (Nov. 9, 1998, vol. 20, Issue 45), pp. 1.

* cited by examiner

PUBLISHING SYSTEM FOR INTRANET

FIELD OF THE INVENTION

The present invention is related to the field of electronic publishing systems. In particular the present invention relates to the field of electronic publishing systems operating in an intranet environment.

BACKGROUND OF THE INVENTION

In the course of collaborative research and development taking place in a large organization, there is a need for an internal publication system that is easy to use and would allow the sharing of information related to the research and development activities. This need may be even greater when the relevant people involved are located in different locations and across various time-zones. The information that needs to shared can take the form of plans, discussions, specifications, technical reports, presentations, timetables, events, meetings, decisions, changes, status reports, and pointers to partner or competitor information. Such a publication system could enable project-team members to work together and share all project-related information. The system could also allow other (manager, sponsors, and people on other projects) to keep in touch with the status, progress and developments.

Several commercially available systems can provide some useful functionality for an internal publishing system. For example, Netscape Publisher and Netscape Composer can be used to allow a client to edit HTML pages and then save them back on the server using the URL address of the source page. However, such systems lack additional features that make a publishing system most effective for the above-described type of application.

SUMMARY OF THE INVENTION

It is an object of the present invention to provide a publishing system that would facilitate the sharing of project-related information in an efficient and easy-to-use manner.

In accordance with the invention, a method of publishing information on a network-based computer system is provided. The preferred method comprises the steps of: displaying a web page on a client computer, the web page including a plurality of sections with each of the sections containing content derived from an HTML file (or other source, e.g. LDAP or XML file) stored on a network server under a file address; editing the content of one of the sections of the web page under direction of a user on the client computer; and transmitting the edited section of the web page to the network server along with the file address corresponding to the HTML file from which said one of the sections derived its content, such that the edited section will be saved on the network server.

The method preferably comprises the step of displaying a web page containing the edited section on a second client computer to a second user, and the file address under which the HTML files are preferably stored is a URL address.

The editing step preferably comprises the steps of: identifying the section of the web page to be edited under direction of the user; retrieving a copy of the HTML file from which the section to be edited derived its content; and altering the content of the HTML file under direction of the user thereby generating an edited HTML file, wherein the edited HTML file is saved using the file address corresponding to the HTML file from which the section to be edited derived its content.

The displaying step preferably comprises: receiving from a client computer an address for an XML template corresponding to the web page to be displayed; resolving from the XML template address for each of the plurality of HTML files that contain content for the sections of the web page; converting each of the plurality HTML files into an XML file, thereby generating a plurality of XML files; combining the plurality of XML files and generating therefrom an HTML output file representing the web page; and transmitting the HTML output file to a browser a application on the client computer.

The combining step preferably comprises: placing each of the plurality of XML files in an appropriate location on the XML template thereby generating an XML output file; and applying an XSL transform file to the XML output file to generate the HTML output file.

Preferably, the XSL transform file is an XSL style sheet and together with the XML template are used to define the format, look & feel, and structuring of the web page.

Additionally, the web page preferably comprises a section containing content derived from an LDAP file. The method also preferably includes controlling the access to the network-based computer system using an LDAP directory server to define and limit the rights of authors and readers within the network. The content of the sections of the web page includes the following possible data types: text, tables, video, graphics, and sound.

In accordance with another aspect of the invention a method of publishing information on a network-based computer system is provided. The method comprising the steps of: transmitting an HTML output file to a browser on a client computer, the HTML output file defining a web page comprising a plurality of sections each of the sections containing content derived from an HTML source file stored on a network server under a file address; receiving an edited HTML file and an address from the client computer, the address corresponding to one of the HTML source files; and saving the edited HTML file on the file system using said corresponding address.

The invention is also embodied in a system for publishing information on a network-based computer system comprising: a web server configured transmit an HTML output file to a browser on a client computer, the HTML output file defining a web page comprising a plurality of sections each of the sections containing content derived from an HTML source file stored on the web server under a file address, the web server also configured to receive an edited HTML file and an address from the client computer, the address corresponding to one of the HTML source files; and to save the edited HTML file on the file system using said corresponding address.

According to another aspect of the invention a system for publishing information on a network-based computer system is provided comprising a client computer configured to display to a user a web page, the web page comprising a plurality of sections each of the sections containing content derived from an HTML file stored on a network server under a file address, to editing the content of one of the sections of the web page under direction of the user on the client computer, and to transmit the edited section of the web page to the network server so as to be saved on the server using the file address corresponding to the HTML file from which said one of the sections derived its content.

DETAILED DESCRIPTION OF THE DRAWINGS

According to a preferred embodiment of the invention a project workspace is provided that scientists can use as a 'working' tool for project groups to communicate and share information (results, data, email, meeting-notes, reports, findings, conclusions, discussion summaries). Preferably, the focus is on communicating and sharing 'work-in-progress' i.e. a live, working tool that helps scientists and other participants to interact. Additionally, the project workspace can also be used for recording and archiving of project information. The project workspace is preferably a central store where people can obtain essential information such as: the project summary, the people involved, and report.

Figure 8:
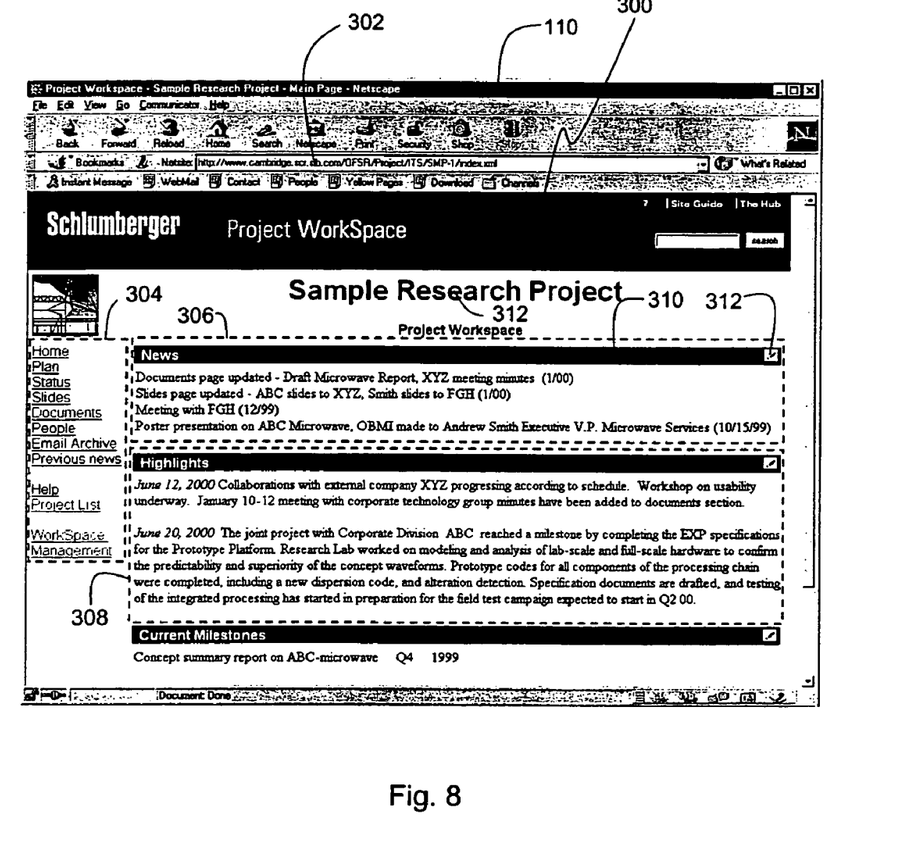
FIG. 8 is an example of a web page from the project workspace, according to a preferred embodiment of the invention.

The project workspace is preferably embodied in multiple web pages stored on a web server and viewable using a standard browser. FIG. 8 is an example of a web page from the project workspace, according to a preferred embodiment of the invention. The example shown in FIG. 8 is a home page for a sample research project. The web page 300 is shown displayed on a browser 110.

Preferably, web page 300 comprises a number of separate sections 304, 306 and 308 (shown with dotted line boxes). Each of the sections 306 and 308 contains a header, an edit button, and content. For example, section 306 is a section entitled "news". The header 310 identifies the section. Advantageously, an edit button 312 is provided that allows certain users to easily edit and then re-publish content. If the user clicks button 312, the browser will retrieve the content of the section, in this case the text of the news section 306. The user can then edit the text and then save, or publish, the edited text using a simple facility.

According to a preferred embodiment there are two primary types of users for the project workspace. Scientists, who internally within each project, use the project workspace as a working tool, at multiple locations. Managers and correspondents are also included in this category. The scientists would ordinarily be the ones entering, updating, organizing and viewing information. Thus the scientists would normally have authority to edit and publish new content on the projects web pages. The second category of users for the project workspace is anyone outside the project who wants to access the information, provided they're authorized to do so. This aspect of the project workspace is primarily for publicizing and information dissemination.

Preferably, the users outside the project also primarily access the system through a web browser. The project workspace supports popular browsers such as Microsoft Internet Explorer and Netscape Navigator.

Preferred features of the project workspace include: a security system that works on a basis of pre-authorized access; a file system used to hold the Project Workspace data is a UNIX server such as a Solaris Server; security and access control based on Lightweight Directory Access Protocol ("LDAP"). As will be discussed in further detail below, Netscape Suitespot server is preferably used as the Web Server, and the primary HTML publishing tool is preferably Netscape Web Publisher.

According to a preferred embodiment of the invention the project workspace interacts with a number of other systems and products that are already used by the users in the course of their jobs. Examples of these products include: Microsoft Office 95, MatLab, E-mail, Eudora 4, and Microsoft Outlook 98. Examples of the systems include: various back up systems, an LDAP personnel directory, and a company web site.

Content in many formats can be used in the web pages within the project workspace. For example, the following picture files can be handled: JPEG, GIF, and TIFF. The following Microsoft Office file can be handled: Word, Excel, and PowerPoint. HTML files can be used for Web pages, and the project workspace can also preferably use MatLab and Encapsulated PostScript (EPS) files.

If there is already a project archive facility in operation in the particular corporate organization, it is preferably used for archiving the project workspace.

A standardized structure is provided that helps visitors to a project find their way around the site. A visitor preferably is able to reach all the important content with just two mouse-clicks. Referring to FIG. 8, according to a preferred embodiment, a standard left hand menu 304 is includes for following items: home, plan, slides, documents, people, previous news, discussion/email lists, and one or more optional user defined items.

The project team is given authority to remove any unwanted items from left-hand menu. An activities web page has menu items that are added by the project group.

Archive structure and page layout should be kept simple, in order to make it as easy as possible to enter and maintain information. The structure should preferably be as flat as possible and the titles of the standard sections should make sense to majority of users. The home page should be designed so as to be appealing to the users. Additionally, templates in HTML are provided for the standard sections.

According to a preferred embodiment, the home page 300 contains the following sections: news section 306, highlights section 308, a milestone section, and sections for risk analysis, project description, and the project objectives (not shown).

In general, the Home page should contain information targeted at the general user. The links from the Home page should access the sections that the user finds most useful.

Another feature of the invention is that access to the home page for editing is controlled by the project team's own members.

A people web page is provided that references information about individuals associated with the project. Typically, this shall include the individual's own professional home page when available, or alternatively, a corporate directory entry. A link to the people page is shown in the left-hand menu 304 of home page 300.

The people web page also preferably includes a section for team members and correspondents. Where the correspondent is an external company or person the People Section should point to the contact details of the correspondent.

A news archive web page provides previous monthly reports that are archived for easy reference.

The documents web page includes written information that is produced by the project. The documents and news archive web pages are easily accessible from the home page using the links in menu 304.

The discussion/email lists page provides access to an archive of email and/or discussion lists for the project. The email archive supports formatted messages (styled text) and MIME attachments. The users are able to create and delete email/discussion lists as required. The email lists may have a distribution list associated with them or may solely be provided for the purpose of archiving email.

Additionally, the users shall be able to define additional web pages as they are needed by the particular project.

The publications web page preferably includes a facility that automatically generates the current publications from submissions to the corporate or site library. This feature automatically produces the content for a web page that can be included in the project workspace.

A facility is also preferably provided that submits documents to project workspace via e-mail. For example, attachments to an email can be filed in the correct location of the archive.

Advantageously, the project workspace web pages are quick and easy to edit and update. The user does not need to understand HTML, rather the editing of the Web site pages is preferably done via a WYSIWYG editor, such as Netscape Composer.

According to a preferred embodiment, more than one means is provided for publishing to the project workspace. For example, the users can use drag and drop, Microsoft office documents, publishing via email can all be used to publish information on the project workspace. A forms-interface is provided for entering and editing a limited set items (i.e. the standard items for all projects) on the web site. When documents are being added to the project workspace the users are prompted for additional meta data. The user does not need to take any further action after publishing to the project workspace for the web site to be updated.

Desktop platforms support the moving and copying of files via a simple "Drag and Drop" procedure. Users on such desktops are able to use this facility to publish to the project workspace.

If a significant number of users in the organization use Microsoft Office products as their main creation and editing tool, then easy publishing to the Project Workspace from these products should be provided. For example, presentations published to the project workspace created using Microsoft Powerpoint should be converted to HTML using an available utility.

A search facility is provided on the web pages of the project workspace. Users are able to easily search the project workspace for the particular project that they are currently browsing. A search engine is provided that indexes all files having textual content, e.g. PDF, text, HTML, MS Microsoft Office. Preferably, an advanced search facility is provided searches against other meta data.

Usage Indicators are also preferably provided. An automatically generated "what's new" function lists what has been added to the archive in a given timeframe. Access log analysis tools allow users to report on the usage of the Project Workspace down to the level of individual pages.

Preferably, a lab notebook style record keeping facility is provided. The project workspace thus advantageously provides an easy way of capturing laboratory notes and data.

The project workspace also provides a facility for publishing mathematical equations in a convenient and readily used format.

The project workspace is designed to work well with at least one widely available WYSIWYG HTML editor. Examples of popular HTML editors are: Microsoft FrontPage, Netscape Composer, SoftQuad HoTMetaL. As will be discussed below, the currently preferred HTML editor is Netscape Composer.

According to one embodiment the project workspace allows for the easy classification of work-in-progress material, so that such work can be either hidden or annotated appropriately. Ideally, material that is classified as 'work in progress' is available only to a group that is defined by the material provider.

In cases where the project workspace is used as the main store for the project's documentation, a solution should be provided for people while they are off site.

Any routine administration is preferably performed automatically. The project workspace is preferably sited on the company's Intranet. This ordinarily provides the bandwidth needed for the facility. If desktops computers are already deployed, as is typically the case, those computers should be used as the platform for the web browsers.

According to a preferred embodiment, a feature is provided that makes it possible to view in the form of a list which people have been granted the right to access an individual project's workspace. In the example of page 300, the link to a people page is provided in menu 304. The leader of each project is ordinarily given authority to add and delete users and groups from the project access list.

Certain areas of the project workspace, and certain projects can be designated "Company Only", so that access by those outside the company is forbidden. A pointer to protected documents can be displayed to non-authorized people doing searches, even though access to the protected document is denied.

Help pages for each function and standard page in the project workspace are provided. These help pages are designed to be user friendly. Also, a user question and feedback facility is preferably provided within the web.

Further detail of the technology used in the construction of the project workspace will now be provided. There are a number of components that combine to provide the preferred embodiment of the project workspace: site structure constructed using XML; publishing via Netscape Publisher; and authentication using a corporate LDAP database.

XML is the 'Extensible Mark-up Language' (extensible because it is not a fixed format like HTML) and is a data format for structured document interchange on the Web. It is designed to enable the use of SGML on the World Wide Web. XML allows the designer to build sites that bring information together from several sources.

XML has many features that allow tasks involved with the project workspace to be automated. One example will be the display of the highlights section 308. These highlights are used in a few places but different views of them are needed. On the front page 300, for example, only the last months highlights may need to be displayed. All the monthly highlights for the project can be combined in another page, giving a combined highlights page.

Each web page has an associated XML template. This template defines the content that builds the page. This template contains links to the other documents, page titles and other information that is needed to build the page. The content in the template is 'wrapped' in XML tags and these are then matched with an XSL style sheet. The XML files do not contain any HTML, all the HTML is in the XSL template file.

Extensible Stylesheet Language (XSL) is a language for expressing stylesheets. It consists of two parts:
1. a language for transforming XML documents, and
2. an XML vocabulary for specifying formatting semantics.

An XSL stylesheet specifies the presentation of a class of XML documents by describing how an instance of the class is transformed into an XML document that uses the formatting vocabulary.

HTTP is preferred over FTP for use in the project workspace. Using the 'put' command in the HTTP protocol has a number of advantages over FTP.
1. The address' of the file is as shown in the URL, this is not the same as the host machines directory structure which is what needs to be known when using FTP.
2. It allows applications to integrate more closely into a recognized work flow.
3. It is handled by the Netscape Publisher Plug-In that also has document management facilities.

The servlet API is a generic extension mechanism for Web servers in the same way that the CGI interface was intended to be. It only supports Java however, which marks it out in this sense from CGI.

Servlet technology is preferably used for the project workspace. This includes integration with LDAP for group and mailing list management (using Sun's JNDI), dynamic generation of HTML using XML and XSL, and content management (using the Netscape Web Publisher Java client library). Further detail on designing such servlets is provided below.

Figure 1:
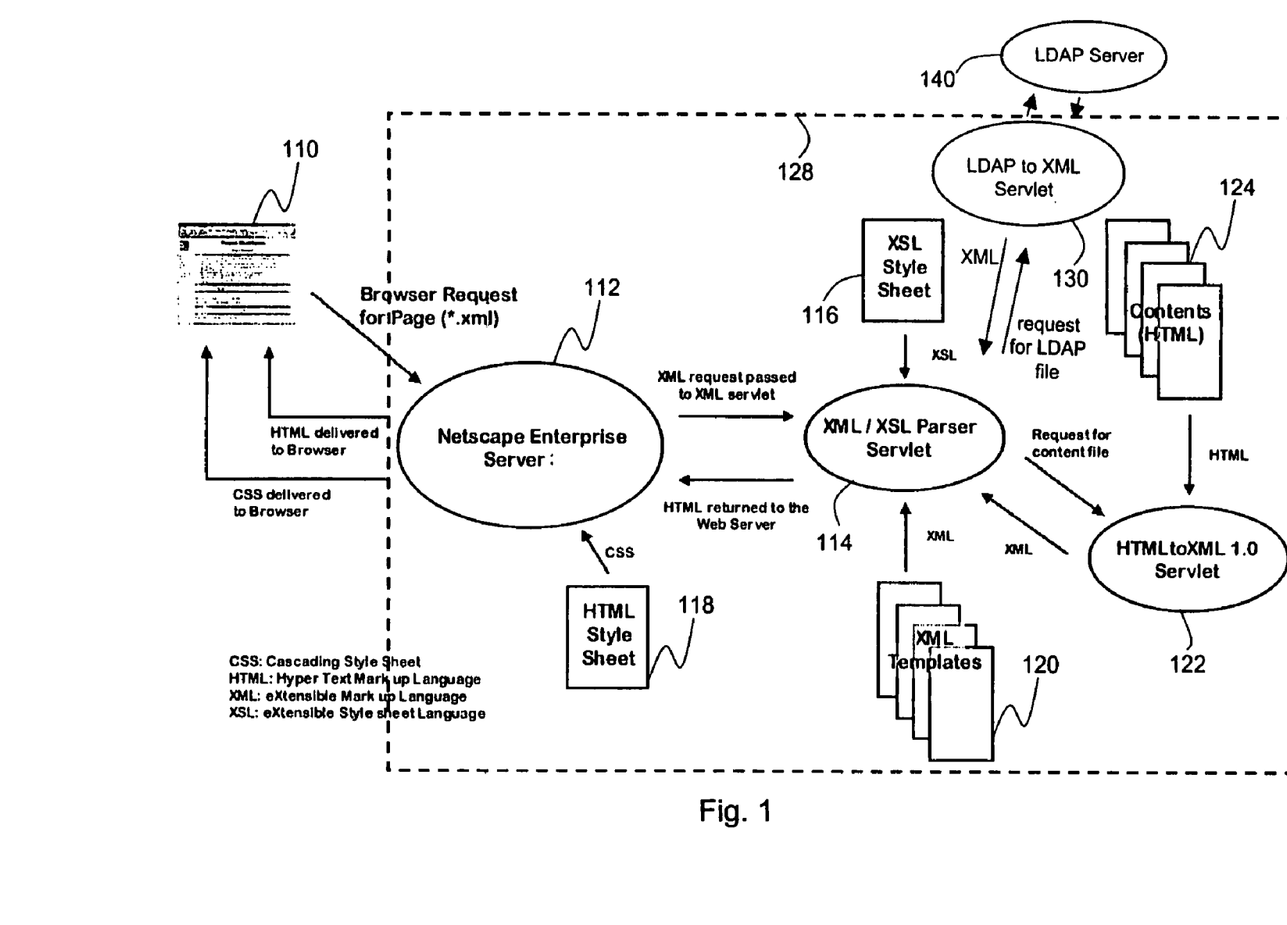
FIG. 1 shows the structure of a project workspace web site, according to a preferred embodiment of the invention.

FIG. 1 shows the structure of a project workspace web site, according to a preferred embodiment of the invention. The site is constructed using a number of products to deliver specific functionality via selected technologies. The project workspace web site has a structure that is constructed out of XML templates using XSL style sheets. FIG. 1 shows how the different servers and servlets are configured to build the web pages. Web browser 110 is shown displaying a web page to a user.

Server 128, shown by the dotted line, includes standard web server application software 112. The server software is preferably Netscape Enterprise since the Publisher plug-in and the Composer functionality are readily available. However, other type of server application software could be used if similar functionality is provided. For example, Microsoft IIS, or Apache software available from Apache.org could be used for server software 112. Server application software 112 provides access to HTML style sheets in Cascading Style Sheet (CSS) format which can be referenced by browser 110. Web server 128 also includes three servlets for parsing, and converting HTML to XML, and LDAP to XML files.

HTML to XML servlet 122 provides a means of transforming HTML content files 124 stored on server 128 into a valid XML document conforming to the XHTML specification. The servlet takes as input a reference to an HTML document available on the local file system. This document is read and, using a freely available HTML parser, converted into a Document Object Model ("DOM") representation. This DOM document is then output again as an XML document conforming to the XHTML specification.

LDAP to XML servlet 130 retrieves LDAP content from an external LDAP server 140, and converts the LDAP content into XML format. Servlet 130 provides a query interface to an LDAP directory returning an XML document as the response. The servlet takes as input a query in the standard LDAP query format. Using the standard J2EE JNDI API, it sends the query to a named LDAP server and retrieves the response. The LDAP response is transformed into an XML document which is returned as the response of the servlet.

Parser servlet 114 retrieves XML templates 120, fetches XML files from the from servlets 122 and 130 (i.e. the XML content rendered by the servlets 122 and 130), places the XML files in appropriate locations in the XML template, and applies XSL transform files 116 to the parsed XML template to generate HTML formatted files. Parser servlet 114 provides a web interface to transforming an XML document using an XSL-T processor. Parser servlet 114 takes as input a URL specifying a XML document either via a common file name extension or as part of the URL path or query string, and optionally an XSL-T file name. If no XSL-T file is specified, the servlet will look for a reference to a file in the input XML document. Using a freely available Java XML parser, the input XML document is parsed into a DOM representation and the XSL-T transform is then applied. The output of the transform is returned as the response of the servlet.

Figure 4:
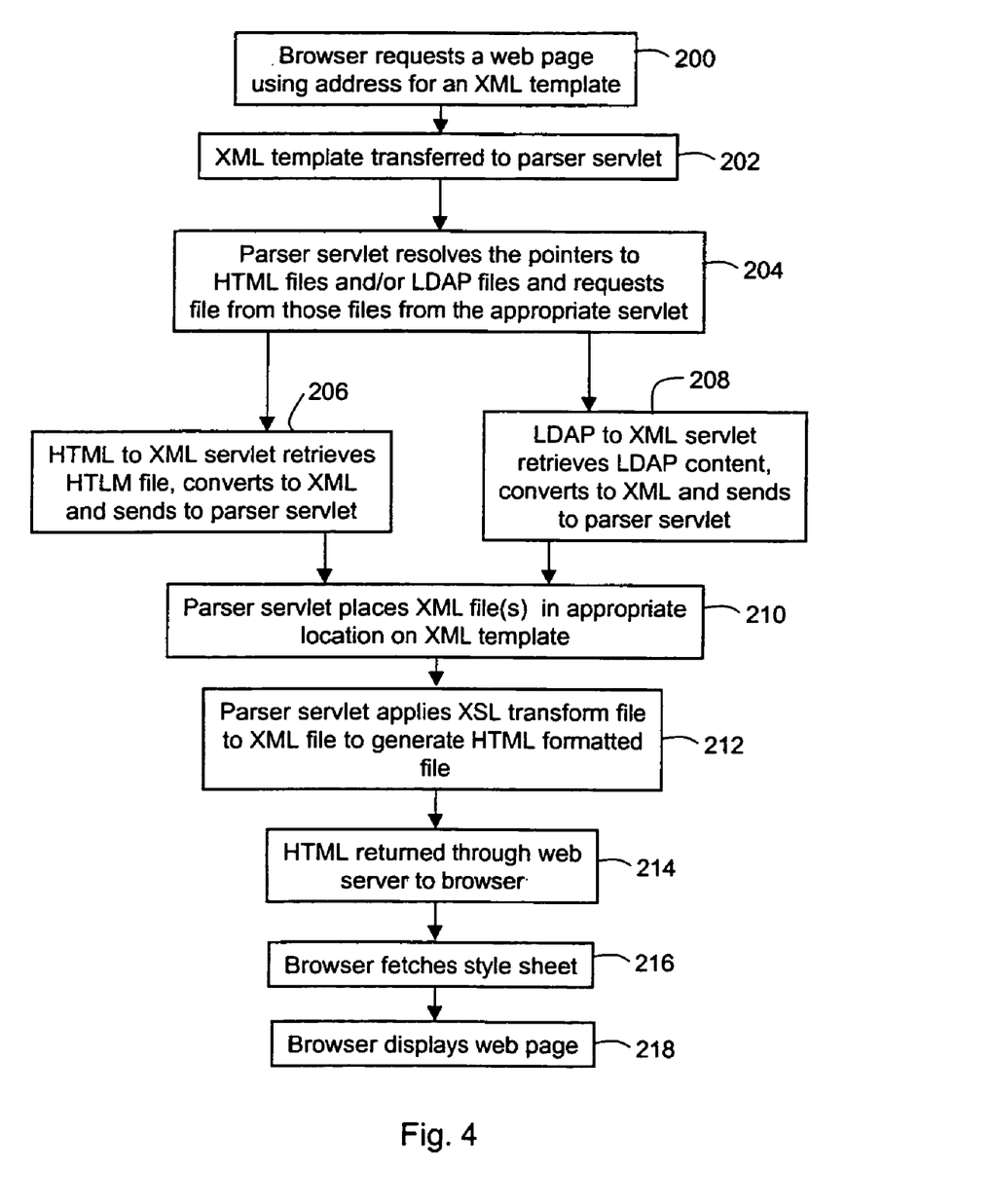
FIG. 4 is a flow chart showing steps involved in providing web page information to a browser, according to a preferred embodiment of the invention.

FIG. 4 is a flow chart showing steps involved in providing web page information to a browser, according to a preferred embodiment of the invention. The structure shown in FIG. 1 is preferably used to provide the functionality shown in FIG. 4, and thus reference will be made to the structural elements shown in FIG. 1. In step 200, browser 110 requests a web page using an address for an XML template. This request is normally itself in response to a mouse click by a user for a particular web page of the project workspace. The XML address is preferably a URL address to an XML template 120 stored on web server 128. In step 202 the XML template corresponding to the URL address is transferred to the parser servlet 114. In step 204, parser servlet 114 resolves the pointers to various URLs that contain content for the requested web page. These URLs are normally addresses to HTML files in the case of most content used in the project workspace. The required content for the web page could also be from other sources, however. For example, LDAP content may be needed for the "people" or "contact" type web pages in the project workspace. In the case of HTML content, the parser servlet requests the HTML files from HTML to XML servlet 122. In the case of LDAP content, servlet 114 makes the request to LDAP to XML servlet 130.

In step 206, HTML to XML servlet 122 retrieves the HTML file (or files), converts the HTML content into XML format and sends the XML formatted content to parser servlet. In step 208 the LDAP to XML servlet 130 retrieves the LDAP content, converts it to XML format, and sends the XML formatted content to parser servlet 114.

In step 210 parser servlet 114 places the XML file(s) from servlets 122 and 130 in appropriate locations in the XML template, thereby generating an XML file containing the require content. In step 212 parser servlet 114 applies XSL-T transform file (shown in FIG. 1 as XSL-T style sheet 116) to the XML file, thereby generating an HTML formatted file.

In step 214 the HTML formatted file generated in step 212 is returned to browser 110 through server application 112. In step 216, browser 110 fetches basic formatting information (such as color) from HTML style sheet 118 in CSS format. Finally, in step 218, browser 110 displays the web page as the HTML formatted file in accordance with style sheet 118.

Advantageously, the XSL-T transform file defines much of the format, structuring, layout, banners, headings, icons (such as the edit icon, describe below), and look and feel of the web page (other than the colors and fonts, which are normally defined by the HTML style sheet in CSS format). Using the XSL-T transform in this way allows for uniformity in these attributes (format, structuring, look and feel, etc) across all the web pages in the project workspace; it also becomes quite easy to make uniform changes to all the web pages. A separate XSL-T transform file can be used for each type of web page. However, according to a preferred embodiment, a single XSL-T transform file is used to define all of the web pages in the project workspace.

Figure 2:
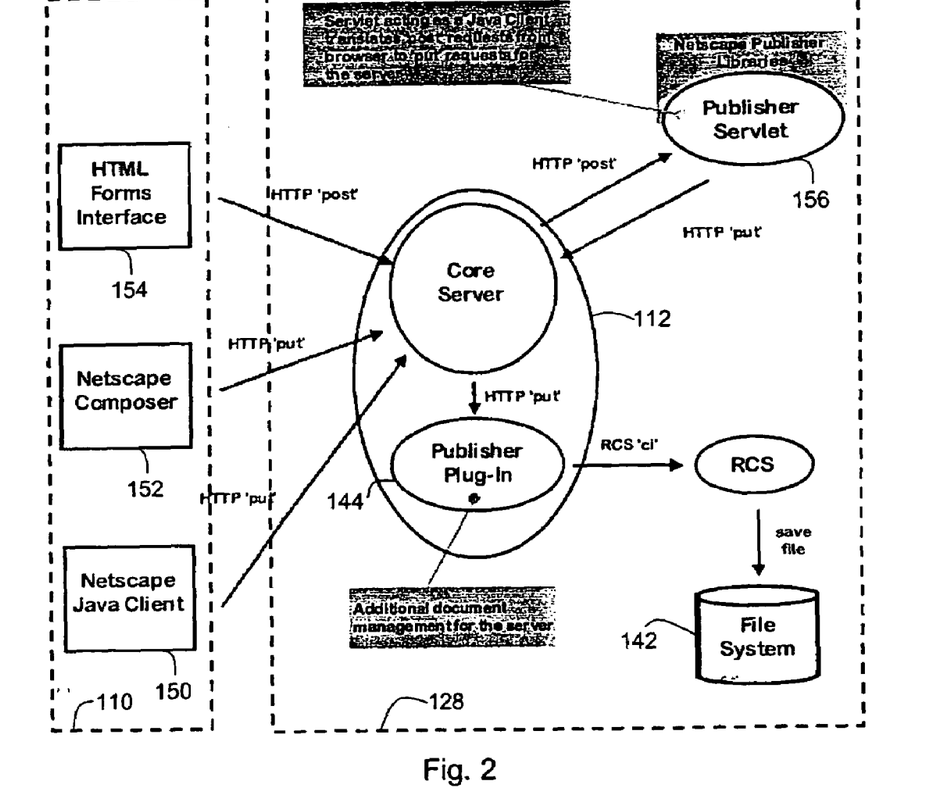
FIG. 2 shows structure for publishing from different interfaces to the web server, according to a preferred embodiment of the invention.

FIG. 2 shows structure for publishing from different interfaces to the web server, according to a preferred embodiment of the invention. The types of interfaces shown for browser 110 are publishing from within Netscape Composer 152, bespoke form interface 154, and Netscape Java Client interface 150.

Netscape Composer 152, available from Netscape is the preferred interface method for editing HTML content for sections of web pages in the project workspace. The user can use Netscape Composer as part of the browser software on the client's computer to edit content on a web page a then use an "HTTP put" command to store the edited content on the web server.

Web server 128, shown by the dashed line. The web server 128 includes (in addition to what is shown in FIG. 1), a publisher plug-in 144, and file system 142 and a publisher servlet 156. Server application 112 includes a publisher module to save the edited content to the file system 142. Preferably, a commercially available module is used, such as the Netscape Publisher plug-in 144. Publisher servlet 156 that allows for the improved control over file management access by the users.

According to the invention, user is able to edit and then publish a single section or portion of a web page. This feature allows for much simplified management of the project workspace web pages. By dividing the web page in to multiple sections, the layout can be made more user friendly. In the example shown in FIG. 8, web page 300 is divided into multiple sections 306, 308, and 304. Editing of the web page is much simpler for a single section of the web page, than it would be for editing the entire web page. Thus splitting the web page into multiple sections allows for a user friendly presentation, and providing editing capability for each section separately allows for user friendly content maintenance. It has been found that project team members can easily maintain their own project web pages using these editing features.

The edit and republish task of a section of a web page consists of retrieving a text version of the section, editing the text using a text editor, and then saving or writing the edited text on the web server at the appropriate location. These tasks are preferably and simply accomplished using the structure shown in the preferred embodiment of FIGS. 1 and 2, and in the discussion of the other figures herein, the reference numbers used refer to the appropriate structures shown in FIGS. 1 and 2.

The Netcape Java client interface 150 can be used to provide the users with many other features, including file management functionality the content stored on file system 142. However, it has been found that for file management a forms-based system is preferred due to the increased simplicity and ease of use for the project team members.

Thus, according to a preferred embodiment, HTML forms interface 154 is used for file management by the users. Publisher servlet 156 provides an HTML forms-based interface to the functionality of the Netscape Publisher plug-in 144. Servlet 156 uses the Netscape Publisher client library written in Java to provide access to all the Netscape server publisher plug-in functionality. This includes the ability to list and browse the Web directory hierarchy, upload, move, rename and delete files, turn file locking on and off, enable or disable versioning of a file and view file and folder attributes including version information. The servlet provides two interfaces, referred to as simple and complete, where the simple interface provides a subset of the functionality provided by the complete interface.

Figure 5:
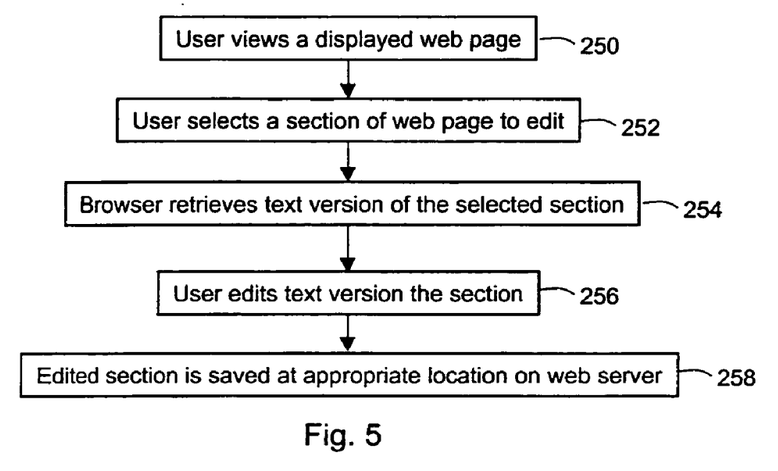
FIG. 5 is a flow chart showing steps involved in editing and publishing content on a project workspace, according to a preferred embodiment.

FIG. 5 is a flow chart showing steps involved in editing and publishing content on a project workspace, according to a preferred embodiment. In step 250 the user views a web page from the project workspace as in described in connection with FIG. 4. In step 252 the user identifies one particular section of the web page he wishes to edit. For example, the user may wish to edit and add content to the "News" section 306 of home page 300 of the workspace for a project he is working on. Preferably, the user selects section 306 by clicking a special edit icon 312 shown on header 310. Edit icon 312 is a URL address pointer to the HTML file 124 that contains the content for section 306. In the example shown in FIG. 8, the edit icon is in the form of a yellow wooden pencil, signifying to the user to capability to easily erase and add new content. In step 254, browser retrieves the text version of the section to be edited. As will be described in greater detail, the browser does this by issuing a request to the web server. In step 256 the user edits the text version of the section of the web page. The user preferably uses a commercial application for this, preferably Netscape Composer 152 running on browser 110. When the user has completed editing the section, the new version of the text is saved at an appropriate location on the web server, step 258.

Figure 6:
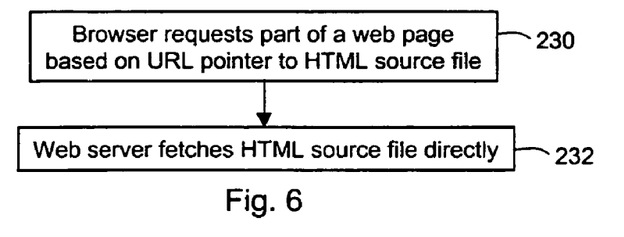
FIG. 6 is a flow chart showing how a portion of a web page is retrieved for editing in step 254 of FIG. 5, according to a preferred embodiment of the invention.

FIG. 6 is a flow chart showing how a portion of a web page is retrieved for editing in step 254 of FIG. 5, according to a preferred embodiment of the invention. In step 230, browser 110 issues a request to web server 128 for part of a web page. The request is done using the URL pointer to the XML template 120 for the web page containing the section to be edited. As mentioned the URL pointer is associated with an edit icon (e.g. icon 312 on FIG. 8). In step 232 the server application 112 simply fetches the HTML file 124 directly using the URL pointer. Since the file 124 is already in HTML format, and since the content of only one section is provided, the servlets 114 and 122 are not used. The server then passes the HTML file to browser 110 for viewing and editing.

Figure 7:
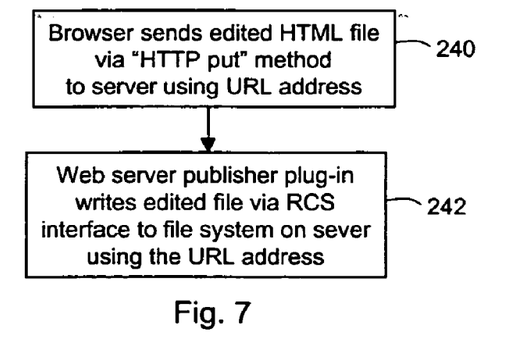
FIG. 7 is a flow chart showing how a portion of a web page is saved, or published, in step 258 of FIG. 5, according to a preferred embodiment of the invention.

FIG. 7 is a flow chart showing how a portion of a web page is saved, or published, in step 258 of FIG. 5, according to a preferred embodiment of the invention. In step 240, browser 110 sends the edited HTML file to web server 128 using an "HTTP Put" command using the URL address associated with the section of the web page being edited. In step 242, web server 128 then used Netscape Publisher plug-in 144 to save the edited HTML file to file system 142. As shown in FIG. 2, file is saved to file system 142 preferably via an RCS interface, and uses the URL address identified by browser 110. Advantageously, using the same URL for retrieving the content to be edited and saving the edited content makes the editing and publishing features extremely simple and easy to use.

Figure 3:
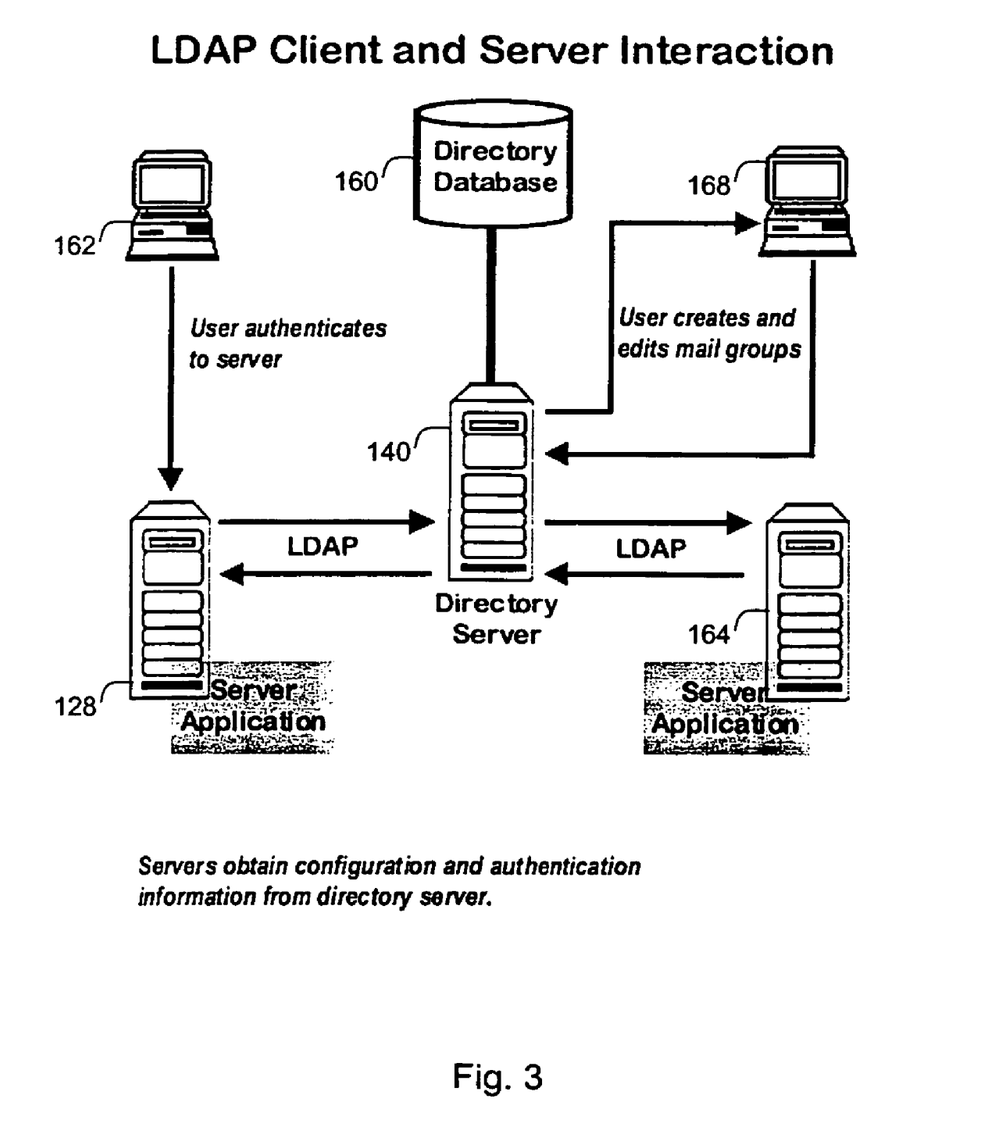
FIG. 3 shows the structure for interfacing with a central corporate LDAP directory server, according to a preferred embodiment of the invention.

FIG. 3 shows the structure for interfacing with a central corporate LDAP directory server, according to a preferred embodiment of the invention. User authentication in the project workspace is preferably accomplished via a corporate LDAP directory server 140.

Each project has groups of individuals defined in the LDAP directory 140 and ACL (Access Control List) lists on the web server 128 for read and write access. When a user's computer 162 accesses the workspace for a project server application 112 authenticates the user against the corresponding list in LDAP directory 114 and then uses the ACL to decide what access rights the user has. As shown in FIG. 3, directory database 160 is accessible via LDAP directory server 140. FIG. 3 also shows another user's computer 168 that can create and edit mail groups via the LDAP directory server 140. Server 164 is which also can access LDAP server 140 could be, for example, another web server for a project workspace for a corporate research facility other than that served by web server 128.

Each project has a people web page as part of the project's project workspace. The membership listed on this web page is preferably controlled via the LDAP services.

Each LDAP group preferably has an owner who is designated as the project manager. The project manager, via an HTML forms interface controls the membership of the groups and thereby controls the access to the particular project's web pages. Thus, using the LDAP authentication system and the preferred structure, the project teams, though the project manager, can manage their own access rights This contributes to the ease of maintenance of the preferred project workspace system.

The above-described embodiments are illustrative of the invention only and are not intended to limit the scope of the present invention.

What is claimed is:

1. A method of controlling a web-based editing and publishing system comprising a network of client computers, network file server and a Light Weight Directory Access Protocol (LDAP) directory server, said method comprising the steps of
   storing on the LDAP directory server information defining and limiting the rights of authors and readers in the system;
   transmitting from the client computer to the file server pointers to one or more files on the network file server and directory files on the LDAP directory server;
   resolving on the file server the pointers into requests for files and directory files;
   retrieving from the LDAP directory server directory content; and
   converting the directory content into web-publishable information and including the web-publishable information as part of the requested files displayed on the client computer for editing further parts of the files.

2. The method of claim 1 further comprising the steps of:
   displaying a web page on a client computer, the web page comprising a plurality of sections each of the sections containing content derived from an HTML file stored on a network server under a file address;
   editing the content of one of the sections of the web page under direction of a user on the client computer; and
   transmitting the edited section of the web page to the network server along with the file address corresponding to the HTML file from which said one of the sections derived its content, such that the edited section will be saved on the network server.

3. The method of claim 2 further comprising the step of displaying a web page containing the edited section on a second client computer to a second user.

4. The method of claim 2 wherein said file address under which the HTML files is stored is a URL address.

5. The method of claim 4 further comprising the step of requesting the web page comprising a plurality of sections using a URL address for an XML template associated with the web page.

6. The method of claim 2 wherein the editing step comprises the steps of:
   identifying the section of the web page to be edited under direction of the user;
   retrieving a copy of the HTML file from which the section to be edited derived its content; and
   altering the content of the HTML file under direction of the user thereby generating an edited HTML file, and wherein the edited HTML file is saved using the file address corresponding to the HTML file from which the section to be edited derived its content.

7. The method of claim 2 wherein the step of displaying comprises:
   receiving from a client computer an address for an XML template corresponding to the web page to be displayed;
   resolving from the XML template address for each of the plurality of HTML files that contain content for the sections of the web page;
   converting each of the plurality HTML files into an XML file, thereby generating a plurality of XML files;
   combining the plurality of XML files and generating therefrom an HTML output file representing the web page; and
   transmitting the HTML output file to a browser a application on the client computer.

8. The method of claim 7 wherein the step of combining comprises:
   placing each of the plurality of XML files in an appropriate location on the XML template thereby generating an XML output file; and
   applying an XSL transform file to the XML output file to generate the HTML output file.

9. The method of claim 8, wherein the XSL transform file is an XSL style sheet that defines the format, look & feel, and structuring of the web page.

10. The method of claim 1 wherein said step of displaying comprises:
    receiving from a client computer an address for an XML template corresponding to the web page to be displayed;
    resolving from the XML template an address for the LDAP files that contain content for the section of the web page;
    converting the LDAP file into an XML file;
    combining the XML file with other XML files and generating therefrom an HTML output file representing the web page; and
    transmitting the HTML output file to a browser a application on the client computer.

11. The method of claim 1 wherein the content of the sections of the web page is of a type which includes the following data types: text, tables, video, graphics, and sound.

12. The method of claim 1 further comprising the steps of:
   transmitting an HTML output file to a browser on a client computer, the HTML output file defining a web page comprising a plurality of sections each of the sections containing content derived from an HTML source file stored on a network server under a file address;
   receiving an edited HTML file and an address from the client computer, the address corresponding to one of the HTML source files; and
   saving the edited HTML file on the file system using said corresponding address.

13. The method of claim 12 further comprising the steps of:
   converting each of the HTML source files into an XML file, thereby generating a plurality of XML files; and
   combining the plurality of XML files and generating therefrom an HTML output file representing the web page having a plurality of sections, each of the sections deriving content from one of said HTML source files.

14. The method of claim 13 further comprising the steps of:
   receiving from a client computer an address for an XML template corresponding to the web page; and
   resolving from the XML template address for each of the HTML source files that contain content for the sections of the web page.

15. The method of claim 14 wherein the step of combining comprises:
   placing each of the plurality of XML files in an appropriate location on the XML template thereby generating an XML output file; and
   applying an XSL transform file to the XML output file to generate the HTML output file.

16. The method of claim 15, wherein the XSL transform file is an XSL style sheet and together with the XML template are used to define the format, look & feel, and structuring of the web page.

17. The method of claim 12 further comprising the step of transmitting a web page containing the edited section to a second client computer under the direction of a second user.

18. The method of claim 12 further comprising the steps of:
   receiving the HTML output file on an client computer;
   displaying the web page based on the HTML output file on the client computer;
   editing the content of one of the sections of the web page under direction of a user on the client computer thereby generating the edited HTML file; and
   transmitting from the client computer the edited HTML file and the address corresponding to one of the HTML source files.

19. The method of claim 18 wherein the editing step comprises the steps of:
   identifying the section of the web page to be edited under direction of the user;
   retrieving a copy of the HTML file from which the section to be edited derived its content; and
   altering the content of the HTML file under direction of the user thereby generating an edited HTML file, wherein said step of saving comprises saving the edited HTML file using the file address corresponding to the HTML file from which the section to be edited derived its content.

20. A computer network for web-based editing and publishing system comprising a network of client computers, network file server and a Light Weight Directory Access Protocol (LDAP) directory server, wherein the LDAP directory server is adapted to store information defining and limiting the rights of authors and readers in the system; and the network file server is adapted to resolve file server pointers to one or more files on the file server and directory files on the LDAP directory server transmitted from the client computer into requests for files and directory files; to retrieve from the LDAP directory server directory content; and to convert the directory content into web-publishable information and including the web-publishable information as part of the requested files displayed on the client computer for editing further parts of the files.

21. The network of claim 20 with the network file server configured transmit an HTML output file to a browser on a client computer, the HTML output file defining a web page comprising a plurality of sections each of the sections containing content derived from an HTML source file stored on the web server under a file address, the web server also configured to receive an edited HTML file and an address from the client computer, the address corresponding to one of the HTML source files; and to save the edited HTML file on the file system using said corresponding address.

22. The system of claim 21 further comprising:
   executable code running on a computer adapted to convert each of the HTML source files into an XML file, thereby generating a plurality of XML files; and
   executable code running on a computer adapted to combine the plurality of XML files and generate therefrom an HTML output file representing the web page having a plurality of sections, each of the sections deriving content from one of said HTML source files.

23. The system of claim 22 further comprising executable code running on a computer configured to receive from a client computer an address for an XML template corresponding to the web page, and resolve from the XML template address for each of the HTML source files that contain content for the sections of the web page.

24. The system of claim 23 wherein the executable code running on a computer adapted to combine is also adapted to place each of the plurality of XML files in an appropriate location on the XML template, thereby generating an XML output file, and to apply an XSL transform file to the XML output file to generate the HTML output file.

25. The network of claim 20 with the client computer configured to display to a user a web page, the web page comprising a plurality of sections each of the sections containing content derived from an HTML file stored on a network server under a file address, to editing the content of one of the sections of the web page under direction of the user on the client computer, and to transmit the edited section of the web page to the network server so as to be saved on the server using the file address corresponding to the HTML file from which said one of the sections derived its content.

* * * * *